United States Patent [19]

Gliemeroth

[11] 4,148,621

[45] Apr. 10, 1979

[54] METHOD FOR MAKING GLASS OPTICAL FIBERS

[75] Inventor: Georg Gliemeroth, Mainz, Fed. Rep. of Germany

[73] Assignee: Jenaer Glaswerk Schott & Gen., Fed. Rep. of Germany

[21] Appl. No.: 732,197

[22] Filed: Oct. 14, 1976

[30] Foreign Application Priority Data

Oct. 15, 1975 [DE] Fed. Rep. of Germany ....... 2546162

[51] Int. Cl.² .......................................... C03B 37/00
[52] U.S. Cl. ...................................... 65/3 A; 65/13; 65/18; 65/60 A; 65/DIG. 7
[58] Field of Search .................. 65/3 A, 13, 18, 60 A, 65/DIG. 7

[56] References Cited

U.S. PATENT DOCUMENTS

| | | | |
|---|---|---|---|
| 3,785,718 | 1/1974 | Gloge | 65/3 A X |
| 3,823,995 | 7/1974 | Carpentier | 65/3 A |
| 3,980,459 | 9/1976 | Li | 65/18 |

OTHER PUBLICATIONS

Optical Fibers Based on Phosphosilicate Glass, Gambling et al., Proceedings of the IEE, vol. 123, No. 6, pp. 570-576, Jun. 1976.

Primary Examiner—Robert L. Lindsay, Jr.
Attorney, Agent, or Firm—Littlepage, Quaintance, Murphy, Richardson and Webner

[57] ABSTRACT

A process for producing an optical fiber comprising;

depositing in a tube silicon and boron oxides, and then, depositing oxides of silicon as well as germanium, phosphorus and/or boron, in addition to an additional oxide such as antimony;

followed by collapsing the tube to form a rod which is drawn into an optical fiber.

15 Claims, 7 Drawing Figures

METHOD FOR MAKING GLASS OPTICAL FIBERS

The use of optical fibers for signal transmission is becoming increasingly interesting. Such optical fibers are typically employed with optical signal generators, which are typically lasers to form pulses of light that are transmitted along the length of the optical fiber. These optical fibers are very small, typically having a diameter approximately equal to that of a human hair. Mechanical problems occur when attempts are made to align the end of the optical fiber with the light source. A certain amount of optical misalignment can be tolerated, depending upon the numerical aperture of the optical fiber. Unfortunately, present optical fibers have too low a numerical aperture. Another disadvantage of present optical fibers is the loss in intensity of the light as it is transmitted through the fiber. Another disadvantage is that the pulse dispersion between inlet and outlet is greater than that which can be tolerated. In general, it is known that the optimum refractive index profile for an optical fiber would be parabolic. However, such a refractive index profile has heretofor not been possible to achieve over a significant part of the diameter. In those cases where a parabolic refractive index profile has been approached, it has generally been a step-wise function, whereas a continuous curve would be desirable. Another disadvantage of present processes for producing optical fibers is that the deposition of materials in the process is in the form of a soot and not in the form of a glassy deposit. Another disadvantage of present optical fibers is that the thermal coefficients of expansion of various components of the fiber are so different that layer separation and breakage subsequently occurs.

Accordingly, it is an object of the present invention to provide an improved process for producing optical fibers, which is substantially free of one or more of the above-described disadvantages.

Another object is to provide a process for producing optical fibers which have a high numerical aperture.

Another object is to provide a process for producing an optical fiber which exhibits a low optical loss.

Another object is to provide a process for producing an optical fiber which shows a low pulse dispersion.

Another object is to provide a process for producing an optical fiber which has a continuous parabolic refractive index profile over a substantial portion of the diameter of the fiber.

Another object is to provide a process for producing an optical fiber wherein the deposited material is deposited as a glassy coating, free of bubbles.

Another object is to provide a process for producing an optical fiber wherein adjacent layers have a low coefficient of thermal expansion.

Additional objects and advantages of the present invention will be apparent to those skilled in the art by reference to the following description and drawings wherein.

Figure 1:
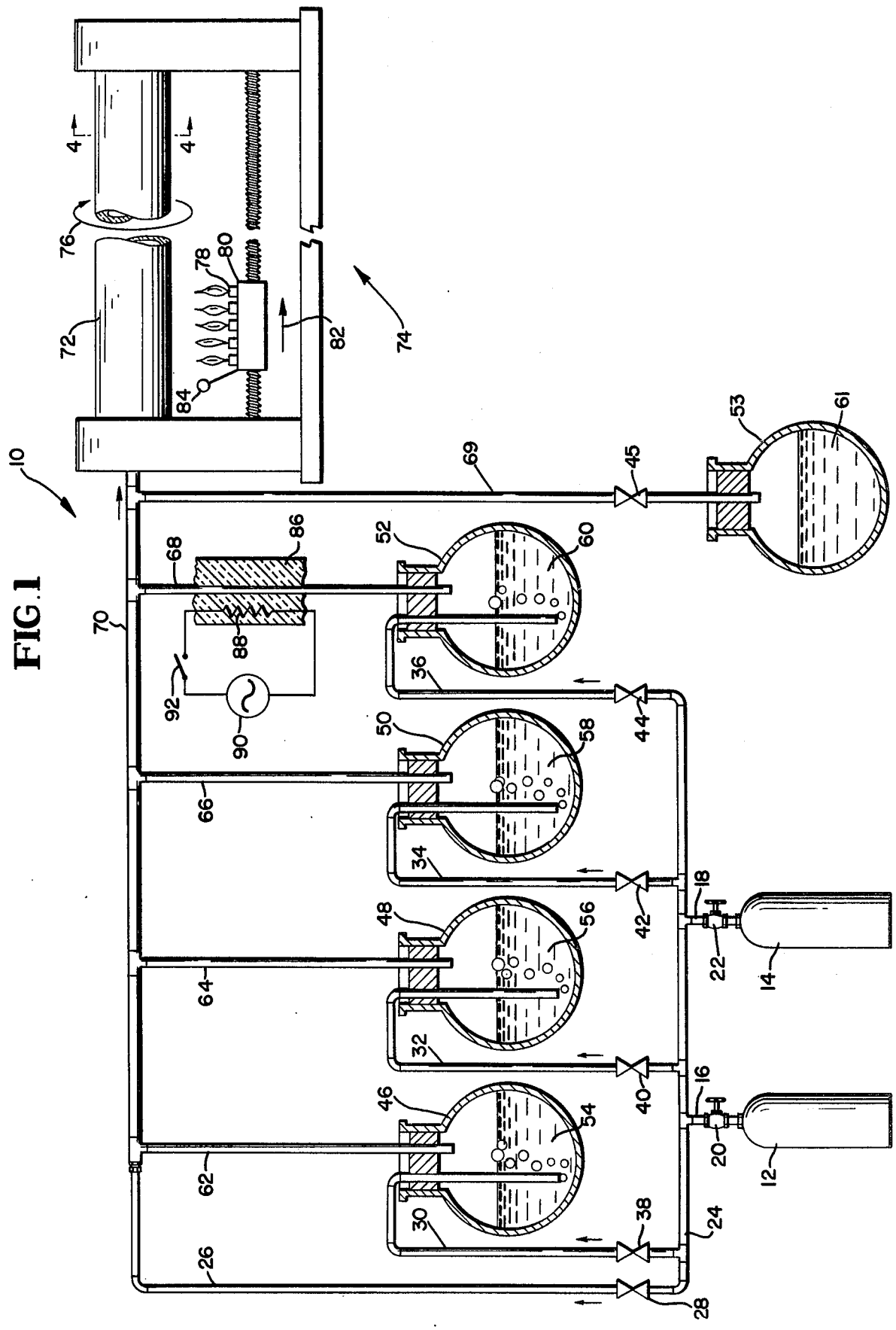
FIG. 1 is a schematic representation of the apparatus employed in the practice and the process of the present invention.

According to the present invention there is a process for producing an optical fiber comprising an optical isolation zone and a light-guiding core having a radial refractive index profile. The process of the present invention comprises depositing a plurality of layers of oxides inside a sheath to form the optical isolation zone. The oxides comprise silicon dioxide and boron oxide, wherein the boron oxide is present in an amount such that its mixture with silicon dioxide has a refractive index lower than that of silicon dioxide.

Then there is deposited a plurality of layers of oxides on the optical isolation zone to form the light-guiding core. These oxides comprise silicon dioxide and at least two oxides selected from the group consisting of and including germanium dioxide, phosphorus pentoxide, and boron oxide and an additional oxide. This additional oxide has a refractive index greater than 1.58. This additional oxide also has a cation diffusion coefficient measured at 860° C. in silicon dioxide of at least $3 \times 10^{-8}$ cm$^2$/sec.

According to the process of the present invention the boron oxide, when present in the core, is present in an amount such that its mixture with silicon dioxide has a refractive index greater than that of silicon dioxide.

In the process of the present invention that portion of the light-guiding core adjacent to the optical isolation zone is rich in silicon dioxide and that portion furthest from the optical isolation zone is rich in oxides having a refractive index greater than that of silicon dioxide.

In the present invention the index of refraction in the core varies step-wise, having its lowest value adjacent to the optical isolation zone and its highest value at its extremity. The gradient profile of the index of refraction across the core closely approximates a parabola. The formula $y = x^a$ defines a parabola when $a = 2$. The deviation herein is expressed as $1.7 < a < 2.2$.

The boron oxide is employed in the optical isolation zone in an amount such that its mixture with silicon dioxide has a refractive index lower than that of silicon dioxide, which is generally at two to fifteen and preferably at three to twelve weight percent based on the combined weight of silicon dioxide and boron oxide.

Phosphorus pentoxide can also be employed advantageously in the optical isolation zone, since it reduces the viscosity of the depositing layer and aids in the formation of a glassy deposit. When present, the phosphorus pentoxide is generally present in a weight ratio with respect to silicon dioxide of generally 2:100 to 20:100 and preferably 5:100 to 15:100. GeO$_2$, Sb$_2$O$_3$, As$_2$O$_3$ and Na$_2$O have been substituted for the P$_2$O$_5$ and give excellent fibers.

The depositing of the layers to form the optical isolation zone can be conducted over widely varying temperatures at which deposition of the oxides takes place, and generally from 1700 to 2200° C. and preferably 1800 to 1950° C.

According to a preferred embodiment of the present invention, the average index of refraction in the optical isolation zone is at least 0.001 and preferably at least 0.003 less than the index of refraction in that portion of the core nearest the optical isolation zone. This can be effected in any convenient manner. According to a preferred embodiment of the present invention, this is effected by depositing one to four layers of oxides consisting essentially of those of silicon, boron and phosphorus.

The depositing of oxides to form the core can occur at widely varying temperatures but is generally effected at 1750 to 2200° C. and preferably at 2050 to 2100° C. These abnormally high temperatures are needed, to give a glassy, flawless deposition, non-porous and without voids and to allow diffusion of the specified component. The number of layers can vary widely but generally comprises from twenty to sixty. Silicon dioxide is an essential oxide in the core. Furthermore, the core must contain at least two of the three oxides of germanium, phosphorus, and boron. When boron is present, it must be present in an amount such that its mixture with silicon dioxide has a refractive index greater than that of silicon dioxide and generally greater than twelve percent. The weight ratio of germanium dioxide to silicon dioxide is generally 15:100 to 200:100 and is preferably 25:100 to 100:100. The weight ratio of phosphorus pentoxide to silicon dioxide is generally 2:100 and 40:100 and is preferably 5:100 to 30:100.

The weight ratio of boron oxide is generally 12:100 to 100:100 and is preferably 12:100 to 50:100. By reference to the above and by reference to the examples included herewith, those skilled in the art will be able to readily select the oxides and determine their weight proportions in order to produce a glassy deposit in accordance with the present invention.

According to the present invention there is provided a fourth oxide in the core. This fourth oxide has a refractive index greater than 1.58 and a cation diffusion coefficient in silicon dioxide measured at 860° C. of at least $3 \times 10^{-8}$ cm$^2$/sec. According to a preferred aspect of the present invention, the fourth oxide is produced by evaporating the corresponding halide at atmospheric pressure and reacting it with oxygen. Therefore, the preferred fourth oxide is one whose halide has a melting temperature at atmospheric pressure of less than 700° C., which is the highest temperature than can presently be conveniently maintained in the production apparatus. Likewise, the preferred halides are those which exhibit a vapor pressure of 760 mm Hg of somewhere between $-100°$ C. and 700° C. Halide components with lower melting points can be done in another apparatus. This requires the vessels containing the halides and through which the oxygen is bubbled to be made of quartz and to be arranged in electrical furnaces with thyrestor temperature controls to maintain the temperature and to arrange similarly for the conduit tubes to be maintained at the same temperature as the vessel. Furthermore, the corresponding oxide should be clear and should have an index of refraction greater than 1.66 and preferably greater than 1.64. Those skilled in the art will be aided in the selection of appropriate halides according to the present invention, by reference to Tables I and II herein. The values for cation diffusion coefficients given in Table II have been experimentally determined and may be subject to experimental inaccuracy.

Table 1

Part 1

| Component | Melting temperature in ° C. | Vapour pres. of 760 mm at ° C. | Oxide and its refractive index | | Component | Melting temperature in ° C. | Vapour pressure of 760 mm at ° C. | Oxide and its refractive index | |
|---|---|---|---|---|---|---|---|---|---|
| $AlB_3H_{12}$ | −64.5 | 45.9 | $Al_2O_3$ | 1.65 | Pb1 | 402.0 | 872.0 | PbO | 2.61 |
| | | | $B_2O_3$ | 1.64 | | | | | |
| $AlBr_3$ | 97.5 | 256.3 | $Al_2O_3$ | 1.65 | LiBr | 547.0 | 1310.0 | $Li_2O$ | 1.644 |
| $AlCl_3$ | 192.4 | 180.3 | $Al_2O_3$ | 1.65 | LiCl | 614.0 | 1382.0 | $Li_2O$ | 1.644 |
| $SbBr_3$ | 96.6 | 275.0 | $Sb_2O_3$ | 2.35 | Mg | 651.0 | 1107.0 | MgO | 1.736 |
| $SbCl_3$ | 73.4 | 219.0 | $Sb_2O_3$ | 2.35 | $MgCl_2$ | 712.0 | 1418.0 | MgO | 1.736 |
| $SbJ_3$ | 167.0 | 401.0 | $Sb_2O_3$ | 2.35 | $MnCl_2$ | 650.0 | 1190.0 | $MnO_2$ | 2.16 |
| $Sb_2O_3$ | 656.0 | 1425.0 | $Sb_2O_3$ | 2.35 | $HgBr_2$ | 237.0 | 319.0 | HgO | 2.55 |
| As | 814.0 | 610.0 | $As_2O_3$ | 1.755 | $HgCl_2$ | 277.0 | 304.0 | HgO | 2.55 |
| | | | | | $HgI_2$ | 259.0 | 354.0 | HgO | 2.55 |
| $AsCl_3$ | −18.0 | 130.4 | $As_2O_3$ | 1.755 | $MoF_6$ | 17.0 | 36.0 | $MoO_3$ | 1.68 |
| $AsF_3$ | −5.9 | 56.3 | $As_2O_3$ | 1.755 | $PBr_3$ | −40.0 | 175.3 | $P_2O_5$ | 1.509 |
| $AsF_5$ | −79.8 | −52.8 | $As_2O_3$ | 1.755 | KBr | 730.0 | 1383.0 | $K_2O$ | 1.608 |
| $As_2O_3$ | 312.8 | 457.2 | $As_2O_3$ | 1.755 | KCl | 790.0 | 1407.0 | $K_2O$ | 1.608 |
| Ba | 850.0 | 1638.0 | BaO | 1.98 | KF | 880.0 | 1502.0 | $K_2O$ | 1.608 |
| $BeB_2H_8$ | 123.0 | 90.0 | BeO | 1.73 | KI | 723.0 | 1324.0 | $K_2O$ | 1.608 |
| | | | $B_2O_3$ | 1.64 | | | | | | part 2

| Component | Melting temperature in ° C. | Vapour pressure of 760 mm at ° C. | Oxide and its refractive index | | Component | Melting temperature in ° C. | Vapour pressure of 760 mm at ° C. | Oxide and its refractive index | |
|---|---|---|---|---|---|---|---|---|---|
| $BeCl_2$ | 405.0 | 487.0 | BeO | 1.73 | Rb | 38.5 | 679.0 | $Rb_2O$ | 1.642 |
| $BeI_2$ | 488.0 | 487.0 | BeO | 1.73 | RbBr | 682.0 | 1352.0 | $Rb_2O$ | 1.642 |
| $BiBr_3$ | 218.0 | 461.0 | $Bi_2O_3$ | 1.91 | RbCl | 715.0 | 1381.0 | $Rb_2O$ | 1.642 |
| $BiCl_3$ | 230.3 | 441.0 | $Bi_2O_3$ | 1.91 | $SiF_4$ | −90.0 | −94.8 | $SiO_2$ | 1.54 |
| Cd | 320.9 | 765.0 | CdO | 2.49 | NaBr | 755.0 | 1392.0 | $Na_2O$ | 1.595 |
| $CdCl_2$ | 568.0 | 967.0 | CdO | 2.49 | NaCl | 800.0 | 1465.0 | $Na_2O$ | 1.595 |
| $CaBr_2$ | 730.0 | 812.0 | CaO | 1.838 | $SnBr_4$ | 31.0 | 204.7 | $SnO_2$ | 2.045 |
| $CdI_2$ | 385.0 | 796.0 | CdO | 2.49 | $SnCl_4$ | −30.2 | 113.0 | $SnO_2$ | 2.045 |
| Cs | 28.5 | 690.0 | $Cs_2O$ | 1.64 | $TeCl_4$ | 224.0 | 392.0 | $TeO_2$ | 2.09 |
| CsBr | 636.0 | 1300.0 | $Cs_2O$ | 1.64 | $TeF_6$ | −37.8 | −38.6 | $TeO_2$ | 2.09 |
| CsCl | 6460 | 1300.0 | $Cs_2O$ | 1.64 | TlBr | 460.0 | 819.0 | $Tl_2O$ | 2.13 |
| $GaCl_3$ | 77.0 | 200.0 | $Ga_2O$ | 1.90 | TlCl | 430.0 | 807.0 | $Tl_2O$ | 2.13 |
| $GeH_4$ | −165.0 | −88.9 | $GeO_2$ | 1.650 | $TiCl_4$ | −30.0 | 136.0 | $TiO_2$ | 2.759 |
| $GeBr_4$ | 26.1 | 189.0 | $GeO_2$ | 1.650 | $WF_6$ | −0.5 | 17.3 | $WO_3$ | 2.52 |
| $PbBr_2$ | 373.0 | 914.0 | PbO | 2.61 | $ZnCl_2$ | 283.0 | 732.0 | ZnO | 2.029 |

Table 1-continued

| | | | | | | | | |
|---|---|---|---|---|---|---|---|---|
| PbCl$_2$ | 501.0 | 954.0 | PbO | 2.61 | ZrCl$_4$ | 437.0 | ZrO$_2$ | 2.20 |
| PbF$_2$ | 855.0 | 1293.0 | PbO | 2.61 | ZrBr$_4$ | 450.0 | ZrO$_2$ | 2.20 |

Table II

| Oxide | Relative diffusion coefficient of the cation cm$^2$/sec. |
|---|---|
| Al$_2$O$_3$ | $2 \times 10^{-6}$ |
| Sb$_2$O$_3$ | $6.3 \times 10^{-5}$ |
| As$_2$O$_3$ | $8 \times 10^{-6}$ |
| BaO | $2.4 \times 10^{-5}$ |
| BeO | $2.5 \times 10^{-3}$ |
| Bi$_2$O$_3$ | $2.6 \times 10^{-4}$ |
| CdO | $2 \times 10^{-4}$ |
| CaO | $1.9 \times 10^{-7}$ |
| Cs$_2$O | $1 \times 10^{-5}$ |
| Ga$_2$O | $4 \times 10^{-3}$ |
| PbO | $1.2 \times 10^{-4}$ |
| Li$_2$O | $9.4 \times 10^{-3}$ |
| MgO | $9 \times 10^{-7}$ |
| MnO$_2$ | $6 \times 10^{-7}$ |
| HgO | $4 \times 10^{-6}$ |
| MoO$_3$ | $5.3 \times 10^{-7}$ |
| K$_2$O | $6.5 \times 10^{-2}$ |
| Rb$_2$O | $7 \times 10^{-4}$ |
| Na$_2$O | $1.6 \times 10^{-6}$ |
| SnO$_2$ | $4 \times 10^{-8}$ |
| TeO$_2$ | $1.7 \times 10^{-4}$ |
| TiO$_2$ | $2.4 \times 10^{-5}$ |
| Tl$_2$O | $1.6 \times 10^{-3}$ |
| WO$_3$ | $1.4 \times 10^{-4}$ |
| ZnO | $1.3 \times 10^{-5}$ |
| ZrO$_2$ | $3 \times 10^{-7}$ |
| B$_2$O$_3$ | $3 \times 10^{-6}$ |
| GeO$_2$ | $1.5 \times 10^{-5}$ |
| P$_2$O$_5$ | $1 \times 10^{-5}$ |

Referring now to the drawings, and in particular, to FIG. 1, there is schematically shown an apparatus 10, suitable for practicing the process of the present invention. The apparatus 10 comprises a gas bottle 12 adapted to hold oxygen and a gas bottle 14 adapted to hold helium. The gas bottles 12, 14 feed through outlet lines 16, 18 each containing valves 20, 22 to manifold 24. The manifold 24 is connected to gas-inlet line 26, which is provided with valve 28. In communication with the manifold 22 are lines 30, 32, 34, 36, each respectively provided with control valves 38, 40, 42, 44. The lines 30, 32, 34, 36 are led to vessels 46, 48, 50, 52, which are adapted to contain various halides in the form of liquids 54, 56, 58, 60. As shown in the first vessel 46, the inlet line 30, extends below the surface of the liquid 54. A similar arrangement exists in the vessels 48, 50, 52. The vessels 46, 48, 50, 52 can be provided with heating means not shown, if necessary to maintain the halide in liquid form. The vessels 46, 48, 50, 52 are respectively provided with outlet lines 62, 64, 66, 68, all of which lead to charging manifold 70. The charging manifold 70 is in vapor communication with the tubular sheath 72. The tubular sheath 72 is held in a glass blower's lathe 74 and is adapted to be rotated as shown by the arrow 76. The lathe 74 is provided with a burner 78 carried by a carrier 80, adapted to be moved along the tubular sheath 72 in the direction of the arrow 82. The carrier 80 is also provided with an optical pyrometer 84, useful in process control. The apparatus 10 is also provided with a boron vessel 53 having an outlet line 69 equipped with a control-valve 45.

The outlet line 62 is provided with a thermal jacket 86, provided with a heating element 88 connected to a power source 90 by means of a switch 92. Each of the outlet lines 64, 66, 68 is also provided with a thermal jacket not shown. The function of the thermal jacket is to maintain the temperature of the halides sufficiently high to avoid deposition in the outlet lines.

Operation of the apparatus 10 for producing the preform proceeds as follows. The vessels 46, 48, 50, 52 and 53 contain halide components; 54, 56, 58, and 60. Oxygen from gas bottle 12 is bubbled through the halides through lines 30, 32, 34, and 36. Thermally insulated outlet line 62, 64, 66, and 68 conduct the vaporized cations from the halides entrained with the oxygen to the inside of the tubular sheath. The oxides are deposited on the inside of the hollow sheath. A burner 78 travels the length of the hollow tube 72 on the carrier 80. The tubular sheath 72 is typically a glass tube of one half meter to 1.5 meters. The external diameter of the tube is between 10 to 25 millimeters and the internal diameter is 5 to 20 millimeters. The tube may be composed of 50–99.9% silicon dioxide. It is also possible to use a two-component glass for the tubular material. The lathe 74 has a constant rotation which can be adjusted between 50–100 rpm. The burner 78 is mounted to travel the length of the tube for the deposition of one layer. The travel rate of the burner is approximately 10–25 cm/min. The temperature of the burner is maintained, increased or decreased by regulatory means not shown. The burner zone is not greater than 5 cm. The temperature in the burning zone is measured with a Williamson 4400 infrared pyrometer 84 working at 5 microns.

Great care is exercised in using pure components and gases, but this method has the great advantage that it is not necessary to maintain a "clean room".

Before deposition of the optical isolation zone, the surface of the inside of the sheath 72 is cleaned by hydrofluoric acid, distilled water, methanol, and a thorough drying by passing clean nitrogen gas through the tube. Additionally the layers may be fined by passing oxygen from gas bottle 12 through the tube with no additional components added thereto, and at temperatures between 1900°–2200° C. and preferably at 2100° C. This insures a continuous glassy coating.

The glassy layers of the isolation zone are deposited on the inside of the tubular sheath 72 by regulating the amount of oxides of the cations of the halides contained in vessels 46, 48, and 50. Typically the optical isolation layer contains two to three components. The regulatory means are not shown in FIG. 1. Generally the process of the optical isolation zone is fined after deposition of the layers comprising the optical isolation zone. The layers of the core are also put down by chemical vapor deposition techniques and using vessels 46, 48, 50, 52 and 53, and, if necessary, vessels not shown in FIG. 1. Generally, additional oxygen is supplied through manifold 14 and gas outlet 26. The helium is generally supplied in an amount between 0.5 to 20 weight percent, but preferably is between 0.6 to 7 weight percent. Additional oxygen and helium may also be supplied in forming the optical isolation zone. The core is from twenty to fifty layers and preferably forty to fifty layers. The layers are glassy, non-porous, and substantially free of voids. Amounts of the various components are given above. Table I and Table II give lists of suitable components.

The sheath with the coating is collapsed by closing off the gas connection with valves 28, 38, 40, 42, and 44. The temperature of the burner is increased to approximately 2200° C. and the burner is passed three times over the tube at a much-reduced travel rate, between 2-8 cm/min. After cooling, the tube is drawn into a fiber according to processes well known in the art. Fiber lengths of 2.5 km have been achieved. These fibers have good flexibility and tensile strength.

The temperature of deposition of the layers is carefully maintained by regulatory means not shown in FIG. 1. It is preferable to maintain a temperature between 1800°-2200° C. in layering the optical isolation zone and to maintain a temperature between 1750°-2150° C. in the formation of the layers forming the core.

Figure 2:
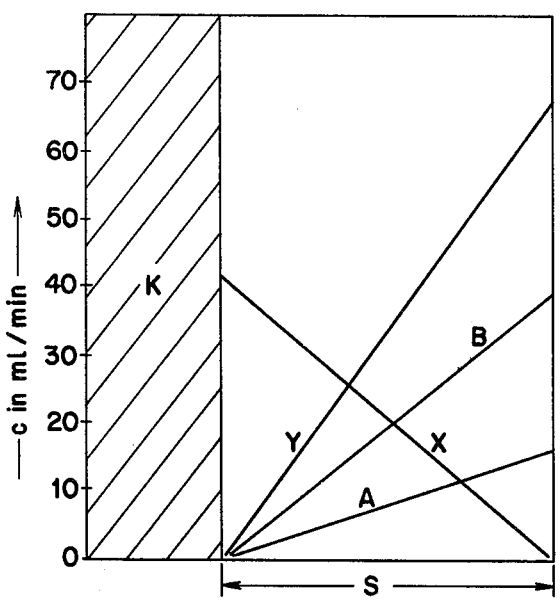
FIG. 2 is a graphic representation showing the variation of concentration of various components as a function of distance.

FIG. 2 shows the changes in the concentration of components X, Y, A & B in the core of the preform and therefore in the fiber. The concentration is given in ml./min. The distance $\delta$ describes the width of the core from the sheath to the inside. Component X has its source from the halide of its cation is vessel 46, Component A from vessel 53 and Component B from vessel 52. As an example, Component X is $SiO_2$, Component A is $B_2O_3$ and Component B is $Sb_2O_3$ component Y from vessel 48 is $GeO_2$.

Figure 3:
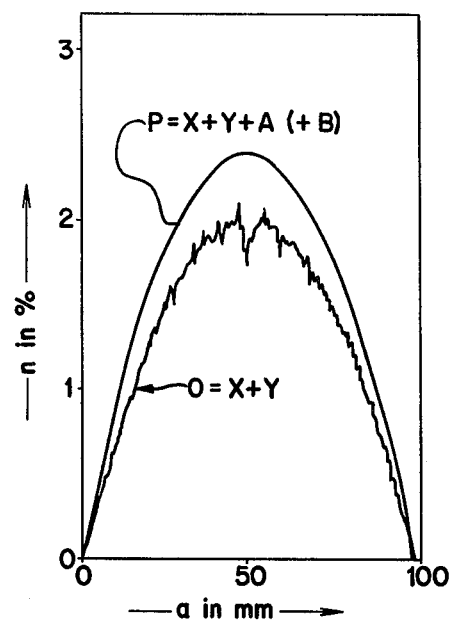
FIG. 3 is a graph showing the index of refraction measured across the core of an optical fiber produced in accordance with the present invention.

FIG. 3 shows the index of refraction in percent in curve O as prior art without diffusion across the diameter of a fiber for a two component system. Curve P shows the same property for an inventive four component system. It can readily be seen that curve P most nearly follows a true parabolic curve by adding the specified diffusing components A and/or B.

Figure 4:
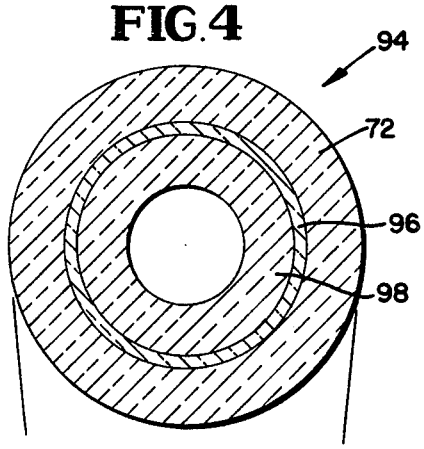
FIG. 4 is a cross-section of the coated hollow tube before collapse taken along line 4—4 of FIG. 1.
Figure 5:
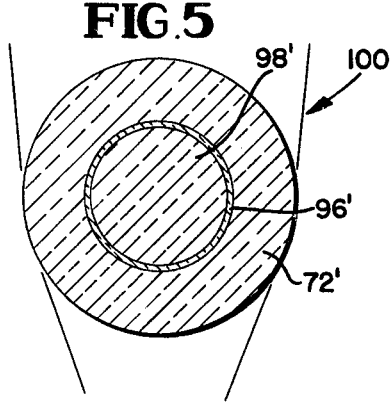
FIG. 5 is a cross-section of the tube after collapse, which is called a rod.
Figure 6:
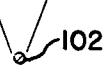
FIG. 6 is a cross-section of a fiber drawn from the rod of FIG. 5.

FIG. 4 shows a cross-section of preform 94 taken along line 4—4 of FIG. 1. The preform 94 has a sheath 72, an optical isolation zone 96, and a core 98. As described herein, the preform 94 is collapsed to form a rod 100 having a sheath 72', an optical isolation zone 96' and a core 98'. As will be appreciated by reference to FIGS. 4 and 5 the core 98 is hollow in preform 94, whereas the core 98' is solid in the rod 100. The rod 100 can be drawn into a fiber 102 as shown in FIG. 6, according to known techniques.

Figure 7:
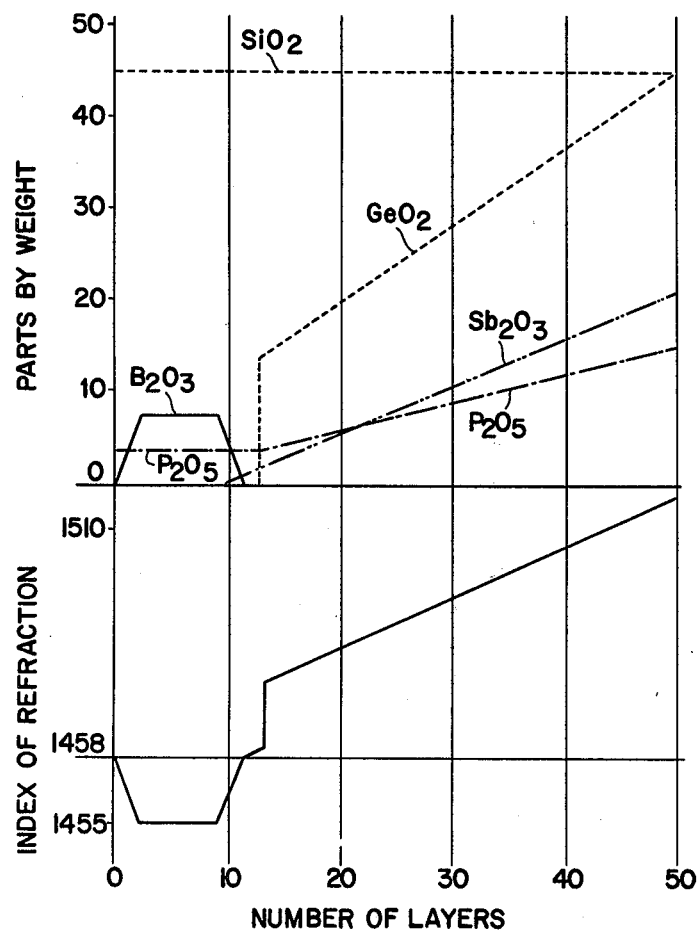
FIG. 7 is a graph of the parts by weight of the oxide components for the layers and the index of refraction of these layers.

FIG. 7 shows a cross-section of a deposition of the layers and the index of refraction, which is linear across the hollow tube. Layers zero through eleven represent the optical isolation layer. Layers fourteen through fifty represent the light-guiding core. FIG. 7 is most nearly a graphic representation of Example 1.

The invention is further illustrated by the following examples in which all parts and percentages are by weight unless otherwise indicated. These non-limiting examples are illustrative of certain embodiments designed to teach those skilled in the art how to practice the invention and to represent the best mode contemplated for carrying out the invention.

EXAMPLE 1

A T08 silicon dioxide tube supplied by Amersil is used. The tube is 1.5 meters long and has an internal diameter of 16 mm. The tube is rotating with 70 rpm on a lath. To prepare the tube for deposition, the hollow tube is first cleaned with hydrofluoric acid diluted 1:10, distilled water, and methanol and dried with clean nitrogen gas. The tube has oxygen passed through at it at a temperature of 2100° C. to prepare the tube for the glassy deposition. This is done with two passes of the burner. In all layering depositions, the rate of the burner is constant and is about 10-25 cm/min. Subsequently, each traversal of the burner along the length of the rod with the concommitant in feed of the components and oxygen will result in the deposition of one layer, which is generally approximately 7 microns in depth.

The optical isolation zone is composed of the layers deposited first on the inside wall of the prepared hollow tube. The oxygen is bubbled through vessels containing $SiCl_4$ and $POCl_3$. $BCl_3$ is added from vessel 53. An additional oxygen stream is added to the tube which has helium entrained with it. 270 cc of oxygen per minute with an addition of 0.7 to 6.0 volume percent of helium is used. Approximately twelve glassy layers are deposited, which form the optical isolation zone. The parts per weight of the $P_2O_5$ and $SiO_2$ are constant and the parts per weight of the deposited $B_2O_3$ is varied by monitoring means regulated by a preset programmer. Thus the parts of $B_2O_3$ are increased stepwise from 0 to 6 parts compared to 45 parts of $SiO_2$ to a plateau of seven constant layers and reduced to 0 at the twelfth layer. The temperature is 1825° C. This results in lowering the index of refraction relative to the refractive index of $SiO_2$. The 45 parts by weight of $SiO_2$ referred to above is equivalent to 72 ml/min of oxygen bubbling through the vessel containing $SiCl_4$ as shown in FIG. 1.

In order to form the glassy deposition of the core the parts of $SiO_2$ deposited remains constant and every additional modifier and glass-former component is increased step-wise, regulated by the monitoring system on command from the programmer. Thus in this example at layer 13, 45 parts of $SiO_2$ were introduced with 2 parts $P_2O_5$ and 3 parts $Sb_2O_3$. At layer 14 the $GeO_2$ is introduced at 14 parts. Vessels containing $SbCl_3$ and $GeCl_4$, which have oxygen bubbling through them, supply the antimony and germanium cations which react with the oxygen to form the respective oxides. With each increasing layer, the deposited $SiO_2$ content remains at 45 parts, the deposited $P_2O_5$ content varies step-wise and linearly from 2 to 12 parts, the deposited $Sb_2O_3$ content varies step-wise and linearly from 1 to 20 parts, and the deposited $GeO_2$ varies step-wise and linearly from 14 to 45 parts. The vessel and tubing to the tube is heated and the oxygen is bubbled through the vessel. Auxiliary oxygen is also supplied and the tube is also heated. From layer 14 up to layer 50 the temperature is step-wise and linearly increased from 1850° to 2050° C. When the 50 layers, each layer being of approximately 7 microns, has been deposited, the gas connection to the rod is closed and the temperature of the burner is increased to 2200° C. The rate of the burner traversing the tube is reduced to 4-6 cm/min. and the tube collapses in three passes of the burner over the tube and the rod is formed. After cooling the rod is drawn into a fiber. The numerical aperture was 0.35 the impulse dispersion was 2.7 ns/km. The optical loss or attenuation at 860 nm was 2.5 db/km and at 1060 nm was 1.7 db/km.

EXAMPLE 2

A tube prepared, as in Example 1, was given the following layers after employing the same pretreatment and using the same apparatus. Before applying the optical isolation layers to form the optical isolation zone, two passes of the burner at 2100° C. with only oxygen were made. Then 20 layers of an optical isolation zone maintaining constant amounts of $BCl_3$ and $SiCl_4$ in the vessels to deposit the respective oxides were deposited. $BCl_3$ has 25 mm height in the flow meter with 50 ml/min flow. The SiCl$_4$ had 150 on the 999 dial of a 500 ml/min [maximum] flow water. (The numerical values recited as dial readings indicate the value on the dial of the oxygen flowing through the vessel containing the halide of the component. Actual values for the flow of the component are obtained from vapor pressure curves.) The temperatures are varied for these 20 layers linearly and step-wise decreasing from 1950° to 1850° C. Two additional traversals of the burner at 2100° C. employing only oxygen were done in order to fine the glassy layer. Subsequent layers had in addition to the SiO$_2$ and B$_2$O$_3$, a step-wise and linearly increase of GeO$_2$ (source GeCl$_4$) and Sb$_2$O$_3$ (source SbCl$_3$). Beginning with 100 on another 999 dial with a maximum flow of 50 ml/min the amount of GeCl$_4$ was increased up to the end of the dial; the amount of SbCl$_3$ was increased up to 460 on the SbCl$_3$ dial. POCl$_3$ was introduced in a constant amount of 050 on a 999 dial of a 500 ml/min [maximum] flow meter. No helium was introduced with the auxiliary oxygen. The tube was collapsed into a rod in the same manner as was done in Example 1. The resultant rod had 54 core layers. The preform had a length of 52 cm, an external diameter of 7.9 mm, and a core diameter of 3.9 mm. The fiber had an external diameter of 130 microns, a total length usable for optical signal transmission of 1.250 km. The optical attenuation at 860 nm is 4.1 db/km and at 1060 nm the attenuation was 2.8 db/km. The numerical aperture is 0.25 and the impulse dispersion is 3.0 ns/km.

EXAMPLE 3

The tube was pretreated as in Examples 1 and 2 and the same optical isolation zone deposited as in Example 2, with the one exception that the SiCl$_4$ had a dial reading of 144. The collapsing and drawing was accomplished as in Examples 1 and 2. For the deposition of the core, beginning at layer 24, the dial for GeCl$_4$ began from 100 and increased to 780 step-wise and linearly; the dial for SbCl$_3$ increased step-wise and linearly from 100 to 370 with the same flow meters. The BCl$_3$ and SiCl$_4$ were constant and the same as in Example 2. The temperature of deposition for the core was 2100° C.

The length of the fiber drawn from the preform was 1.090 meters with an external diameter of 130 microns. The attenuation at 860 nm was 2.60 db/km and at 1060 nm was 1.40 db/km. The impulse dispersion was 1.7 ns/km and the numerical aperture was 0.263.

EXAMPLE 4–7

In Examples 4–7 equal molar weights of GeCl$_4$, SbCl$_5$, AsCl$_5$ and NaCl respectively were substituted for the POCl$_3$ in Example 1 in forming the layers of the optical isolation zone. These components were, of course, deposited as the respective oxides. Fibers of these compositions have equally good db/km and ns/km values and exhibit higher numerial apertures with values up to 0.48.

EXAMPLES 8–9

In Example 8, GeFl$_4$ was substituted for the GeCl$_4$ in Example 4, in forming the optical isolation zone. These fibers have properties similar to those in Example 4.

In Example 9 NaF was substituted for the NaCl in the Example 7. For those examples which employ halide components with melting points between room temperature and 700° C., another apparatus was used. The bubbling vessels were built from quartz and situated in small electrical furnaces with thyrestor temperature control, and the tubes carrying the gas were maintained at the same temperature of the vessels.

EXAMPLES 10–15

Example 1 was repeated employing the same times, conditions, and reactants with the exception that in the deposition of the core, the SbCl$_3$ was replaced by an equal molar amount of the chlorides of As, Sn, Na, W, and Li. Fibers of equally good quality as those produced in Example 1 were obtained with the single exception that the lithium substituent gave poor results.

As can be seen from the above examples the fibers have outstanding properties such as high numerical aperture, low optical loss and low pulse dispersion.

The numberical aperture, NA, is calculated from the refractive index n and a difference in refractive index n between the sheath, which is often referred to as the cladding, and the maximum refractive index. The formula for the numerical aperture is: $Na = \sqrt{2n\Delta n}$ The optical loss for the fibers produced by this method is also very low. Optical loss or attenuation values are expressed as db/km.

The pulse dispersion is measured in ns/km and is very low for the inventive fibers.

The diffusion coefficient, measured in cm$^2$/sec was established by experiments in silicon oxide at 1900° C. The measurements of diffusion were done by profile measurements to calculate the diffusion depth and time dependence. From these measurements, the relative diffusion coefficients resulted. These can be compared for relative purposes, but because of interdiffusion effects in composite materials, may not correlate with other diffusion coefficient estimations.

It is a great advantage to mix combinations of components which provide a glass for the fibers which are suitable from the point of view of glass manufacture. For example, the expansion coefficients of the tube and coatings can be adapted. Thus it is no longer necessary to accept very large differences in tension inside the preshaped element or preform. It is well known that these differences in tension lead to signal dispersion and to fiber breakage. Additional components can be introduced into the coatings. for instance, bromides, iodides, and fluorides can be introduced without any difficulty. They increase the refractive power and improve other properties of the fiber. Additionally, it is possible to introduce elements, other salts, complex compounds, organic components, and organic metallic components in addition to the oxides already designated in the core. Those components of an organic nature can be incorporated, provided that they do not increase the losses in the fibers due to the water content.

An optical fiber comprising a sheath, an optical isolation zone, and a light guiding core having a parabolic refractive index profile, can be produced by depositing at 1800° to 1950° C. eight to fifteen layers of oxides inside a tubular sheath of silicon dioxide, said oxides consisting essentially of silicon dioxide, and boron oxide, wherein the boron oxide comprises from three to twelve weight percent based on the combined weight of silicon dioxide and boron oxide, and phosphorus pentoxide, wherein the weight ratio of phosphorus pentoxide to silicon dioxide is 5:100 to 15:100 and the layers each have a thickness of from 1 to 50 microns; are glassy, non-porous, and substantially free of voids; and have a refractive index less than that of silicon dioxide.

Additional layers are formed by depositing at 2050° to 2150° C., one to four layers of oxides consisting essentially of silicon dioxide, and phosphorus pentoxide, wherein the weight ratio of phosphorus pentoxide to silicon dioxide is 5:100 to 15:100 and the layers each have a thickness of 1 to 50 microns, are glassy, non-porous, and substantially free of voids; and have a refractive index that varies at least 0.003 measured from the first to the last layer; and the layer with the lowest refractive index is deposited first, and the layer with the highest refractive index is deposited last. The layers deposited at 2050° to 2150° C. and the layers previously deposited at 1800° to 1950° C. constitute an optical isolation zone.

A core is formed by depositing at 1800° to 2100° C., twenty to sixty layers of oxides consisting essentially of silicon dioxide, germanium dioxide, phosphorus pentoxide, and antimony oxide; and the weight ratio of germanium dioxide to silicon dioxide is 25:100 to 120:100; and the weight ratio of phosphorus pentoxide to silicon dioxide is 5:100 to 30:100; and the weight ratio of antimony oxide to silicon dioxide is 1:100 to 50:100; and the layers each have a thickness of 1 to 50 microns; and are glassy, non-porous, and substantially free of voids; and have a refractive index which varies linearly from about 1:46 to about 1.52, the lower value occurring adjacent to the optical isolation zone. The ratio of germanium dioxide to silicon dioxide and the ratio of phosphorus pentoxide to silicon dioxide and the ratio of antimony dioxide to silicon dioxide all have lower values adjacent to the optical isolation zone than their values furthest from the optical isolation zone.

The tube is uniformly collapsed to form a rod wherein the linear index of refraction profile in the core in the tube is transformed into a parabolic index of refraction profile in the rod and the rod is drawn into an optical fiber.

Although the invention has been described in considerable detail with reference to certain preferred embodiments thereof, it will be understood that variations and modifications can be effected within the spirit and scope of the invention as described above and as defined in the appended claims.

What is claimed is:

1. A process for producing an optical fiber comprising a sheath, an optical isolation zone, and a light-guiding core having a parabolic refractive index profile, said process comprising:
    I. depositing at 1800 to 1950° C. eight to fifteen layers of oxides inside a tubular sheath of silicon dioxide, said oxides consisting essentially of:
        A. silicon dioxide, and
        B. boron oxide, wherein the boron oxide comprises from three to twelve weight percent based on the combined weight of silicon dioxide and boron oxide,
        C. phosphorus pentoxide, wherein the weight ratio of phosphorus pentoxide to silicon dioxide is 5:100 to 15:100;
    wherein the layers each have a thickness of from 1 to 50 microns;
    wherein the layers are glassy, are non-porous, and are substantially free of voids;
    wherein the layers have a refractive index less than that of silicon dioxide;
    and then;
    II. depositing at 2050° to 2150° C., one to four layers of oxides consisting essentially of:
        A. silicon dioxide, and
        B. phosphorus pentoxide, wherein the weight ratio of phosphorus pentoxide to silicon dioxide is 5:100 to 15:100;
    wherein the layers each have a thickness of 1 to 50 microns;
    wherein the layers are glassy, are non-porous, and are substantially free of voids;
    wherein the layers have a refractive index that varies at least 0.003 measured from the first to the last layer;
    wherein the layer with the lowest refractive index is deposited first;
    wherein the layer with the highest refractive index is deposited last;
    wherein the intermediate layers have intermediate refractive indices;
    wherein the layers deposited in this step and the preceeding step constitute an optical isolation zone;
    III. depositing at 1800° to 2100° C., twenty to sixty layers of oxides consisting essentially of:
        A. silicon dioxide,
        B. germanium dioxide,
        C. phosphorus pentoxide, and
        D. antimony oxide;
    wherein the weight ratio of germanium dioxide to silicon dioxide is 25:100 to 120:100;
    wherein the weight ratio of phosphorus pentoxide to silicon dioxide is 5:100 to 30:100;
    wherein the weight ratio of antimony oxide to silicon dioxide is 1:100 to 50:100;
    wherein the layers each have a thickness of 1 to 50 microns;
    wherein the layers are glassy, are non-porous, and are substantially free of voids;
    wherein the layers have a refractive index which varies linearly from about 1.46 to about 1.52, the lower value occurring adjacent to the optical isolation zone;
    wherein the ratio of germanium dioxide to silicon dioxide and the ratio of phosphorus pentoxide to silicon dioxide and the ratio of antimony dioxide to silicon dioxide all have lower values adjacent to the optical isolation zone than their values furthest from the optical isolation zone;
    IV. uniformly collapsing the tube to form a rod wherein the linear index of refraction profile in the core in the tube is transformed into a parabolic index of refraction profile in the rod;
    V. drawing the rod into an optical fiber.

2. A process for producing an optical fiber comprising a sheath, an optical isolation zone, and a light-guiding core having a parabolic refractive index profile, said process comprising the steps of:
    I. depositing a plurality of layers of oxides inside a tube to form the optical isolation zone, said oxides comprising:
        A. silicon dioxide, and
        B. boron oxide, wherein the boron oxide is present in an amount such that its mixture with silicon dioxide has a refractive index lower than that of silicon dioxide and then;
    II. depositing a plurality of layers of oxides on the optical isolation zone to form the light-guiding core, said oxides comprising:
        A. silicon dioxide, and
        B. at least two oxides selected from the group consisting of:
            (1) germanium dioxide, (2) phosphorus pentoxide, and
(3) boron oxide, in an amount such that its mixture with silicon dioxide has a refractive index greater than that of silicon dioxide, C. an oxide selected from the group consisting of oxides of antimony, tin, sodium, tungsten and mixtures thereof, wherein that layer adjacent to the optical isolation zone has the lowest index of refraction;

wherein that layer furthest from the optical isolation zone has the greatest index of refraction;

wherein the index of refraction of intermediate layers varies linearly;

wherein the sheath optical isolation zone and core constitute a preform;

III. collapsing the preform to form a rod;

IV. drawing the rod into an optical fiber having a parabolic refractive index profile.

3. The process of claim 2, wherein the depositing of the layers to form the optical isolation zone is effected at a temperature of 1700° to 2200° C.

4. The process of claim 2, wherein the depositing of the layers to form the core is effected at a temperature of 1750° to 2150° C.

5. The process of claim 2, wherein the oxides of the optical isolation zone further comprise phosphorus pentoxide.

6. The process of claim 5, wherein the weight ratio of phosphorus pentoxide to silicon dioxide is 2:100 to 20:100.

7. The process of claim 2, wherein the boron oxide in the optical isolation zone comprises from two to fifteen percent by weight, based on the combined weight of boron oxide and silicon dioxide.

8. The process of claim 2, wherein the weight ratio of germanium dioxide to silicon dioxide is 15:100 to 200:100.

9. The process of claim 2, wherein the weight ratio of phosphorus pentoxide to silicon dioxide in the core is 2:100 to 40:100.

10. The process of claim 2, wherein the weight ratio of the additional oxide to silicon dioxide is 2:100 to 70:100.

11. The process of claim 2, wherein the depositing of the layers in the core is effected at a temperature of 1750° to 2150° C.

12. The process of claim 2, wherein the layers each have a thickness of from 1 to 50 microns.

13. The process of claim 2, wherein the layers are glassy, are non-porous and are substantially free of voids.

14. The process of claim 2, wherein the average index of refraction in the optical isolation zone is at least 0.001 less than the index of refraction in that portion of the core nearest the optical isolation zone.

15. The process of claim 2, wherein the index of refraction profile in the core of the fiber follows the equation, $n = x^a$;

wherein "n" is the index of refraction; "x" is a dimension transverse to the running length of the fiber; and "a" is 1.7 to 2.2.

* * * * *